(12) United States Patent
Merjanian (10) Patent No.: US 11,775,702 B2
(45) Date of Patent: Oct. 3, 2023

(54) AR ENHANCED STRUCTURAL TRANSFORMATION ESTIMATOR AND MODELING ENGINE

(71) Applicant: TITAN HEALTH & SECURITY TECHNOLOGIES, INC., Newport Beach, CA (US)

(72) Inventor: Vic A. Merjanian, Newport Beach, CA (US)

(73) Assignee: TITAN HEALTH & SECURITY TECHNOLOGIES, INC., Newport Beach, CA (US)

( * ) Notice: Subject to any disclaimer, the term of this patent is extended or adjusted under 35 U.S.C. 154(b) by 60 days.

(21) Appl. No.: 17/591,122

(22) Filed: Feb. 2, 2022

(65) Prior Publication Data
US 2022/0245292 A1 Aug. 4, 2022

Related U.S. Application Data

(60) Provisional application No. 63/145,343, filed on Feb. 3, 2021.

(51) Int. Cl.
| | |
|---|---|
| *G06F 30/00* | (2020.01) |
| *G06F 30/13* | (2020.01) |
| *G06T 19/00* | (2011.01) |
| *G06T 19/20* | (2011.01) |
| *H04W 4/38* | (2018.01) |
| *G06F 111/18* | (2020.01) |

(52) U.S. Cl.
CPC ............ *G06F 30/13* (2020.01); *G06T 19/006* (2013.01); *G06T 19/20* (2013.01); *G06F 2111/18* (2020.01); *G06T 2210/04* (2013.01); *G06T 2219/004* (2013.01); *G06T 2219/2016* (2013.01); *H04W 4/38* (2018.02)

(58) Field of Classification Search
None
See application file for complete search history.

(56) References Cited

U.S. PATENT DOCUMENTS

| | | | | |
|---|---|---|---|---|
| 2015/0026109 | A1* | 1/2015 | Park | G06N 3/042 706/46 |
| 2018/0003499 | A1* | 1/2018 | Locatelli | G01C 15/006 |

(Continued)

OTHER PUBLICATIONS

International Search Report & Written Opinion dated May 12, 2022 for International Application No. PCT/US2022/014887 filed Feb. 2, 2022.

(Continued)

*Primary Examiner* — Martin Mushambo
(74) *Attorney, Agent, or Firm* — Sheppard, Mullin, Richter & Hampton LLP (57) ABSTRACT

Individual nodes of a plurality of nodes can be fixed to the architectural structure and associated with a different segment of a plurality of segments of a first model of an architectural structure. Positional data associated with the nodes can be received. A structural change to the architectural structure can be estimated based on a comparison of positional data associated with the nodes. A second model representing the architectural structure as modified by the structural change can be generated. The second model can be generated based on (i) the first model and (ii) the estimated change to the architectural structure.

20 Claims, 6 Drawing Sheets

(56) References Cited

U.S. PATENT DOCUMENTS

2019/0094021 A1* 3/2019 Singer .................. G01C 15/008
2019/0318168 A1* 10/2019 Meier .................... G06V 20/10
2020/0311468 A1* 10/2020 Kim ........................ G06N 3/08

OTHER PUBLICATIONS

Kypris et al., "3-D Displacement Measurement for Structural Health Monitoring Using Low-Frequency Magnetic Fields," IEEE Sensors Journal, vol. 17, No. 4, Feb. 5, 2017, 10 pages.

Marx et al., "Structural Health Monitoring (SHM) AN DER Scherkondetalbrke: eine semi-integrale Eisenbahn-Betonbrucke," Beton-Und Stahlebetonbau, John Wiley, Hoboken, USA, vol. 110, Aug. 20, 2015, 7 pages.

Rainieri et al., "Structural Health Monitoring Systems as a Tool for Seismic Protection," The 14th World Conference on Earthquake Engineering, Oct. 12-17, 2008, Beijing, China, 8 pages.

Wu et al., "Local positioning systems versus structural monitoring: a review," Structural Control and Health Monitoring, 2014; 21:1209-1221. Published online Jan. 19, 2014.

\* cited by examiner

AR ENHANCED STRUCTURAL TRANSFORMATION ESTIMATOR AND MODELING ENGINE

REFERENCE TO RELATED APPLICATION

The present application claims priority to U.S. Patent Application No. 63/145,343, filed Feb. 3, 2021 and titled "AR ENHANCED STRUCTURAL TRANSFORMATION ESTIMATOR AND MODELING ENGINE," which is incorporated herein by reference in its entirety.

TECHNICAL FIELD

The disclosed technology relates generally to detecting and predicting structural transformation changes of a structure, and in particular some embodiments relate to technology for generating and providing information relating to the detected and predicted structural transformation changes.

BACKGROUND

In some instances, it may be necessary to determine structural transformations of an architectural structure (e.g., structure), such as a building, warehouse, or the like. No structure can maintain its structure indefinitely. For instance, even safe structures can, due to natural elements and time, develop structural transformations. Additionally, catastrophic events including floods, tornados, earthquakes, fires, or the like can induce stress on the structure such that the structure may accelerate development of the structural transformations. There exist some conventional approaches that enable static identification of structural transformations. For example, a structural engineer may pore over a blueprint of the structure and identify its structural transformations. However, such conventional approaches are static by nature and do not reliably detect and report slowly developing structural transformations in a timely fashion. be adequately responsive to Further, structural transformations may develop such that the transformations are focused on certain parts of the structure that may not be apparent on a blueprint or can be hidden from the naked eye. These kinds of structure transformations may go unidentified or unnoticed for an extended period. Accordingly, there exists a need for better systems and methods for detecting structural transformations of an architectural structure in real-time.

BRIEF SUMMARY OF EMBODIMENTS

One aspect of the present disclosure is directed to a system for communicating information within a geofence. The system may comprise a mesh network including a source node and one or more non-source nodes, the one or more non-source nodes including a first non-source node, the source node and the one or more non-source nodes individually comprising a memory and a processor; the source node located at a source location, the source node configured to perform: generating geofenced message information, the geofenced message information defining a geofenced message for one or more non-source nodes within the geofence; and transmitting the geofenced message information for reception by one or more non-source nodes within a communication range of the source node, the one or more non-source nodes within the communication range of the source node including the first non-source node; and the first non-source node located at a first location, the first-non-source node configured to perform: receiving the geofenced message information; and responsive to receiving the geofenced message information: transmitting the geofenced message information for reception by one or more non-source nodes within a communication range of the first non-source node; determining whether the first location of the first non-source node is within the geofence; responsive to determining that the first location of the first non-source node is within the geofence, presenting the geofenced message; and responsive to determining that the first location of the first non-source node is not within the geofence, not presenting the geofenced message.

Another aspect of the present disclosure is directed to another system for communicating information within a geofence. The system may comprise a memory and one or more processors. The memory may store instructions that, when executed by the processor(s), may cause the system to perform: receiving geofenced message information, the geofenced message information defining a geofenced message for one or more non-source nodes within the geofence; and responsive to receiving the geofenced message information: transmitting the geofenced message information for reception by one or more non-source nodes within a communication range of the system; determining whether a location of the system is within the geofence; responsive to determining that the location of the system is within the geofence, presenting the geofenced message; and responsive to determining that the location of the system is not within the geofence, not presenting the geofenced message.

Another aspect of the present disclosure is directed to another system for communicating information within a geofence. The system may comprise a memory and one or more processors. The memory may store instructions that, when executed by the processor(s), may cause the system to perform: generating geofenced message information, the geofenced message information defining a geofenced message for one or more non-source nodes within the geofence; and transmitting the geofenced message information for reception by one or more non-source nodes within a communication range of the system, the one or more non-source nodes within the communication range of the system including a first non-source node located at a first location; wherein the first non-source node, responsive to receiving the geofenced message information, performs: transmitting the geofenced message information for reception by one or more non-source nodes within a communication range of the first non-source node; determining whether the first location of the first non-source node is within the geofence; responsive to determining that the first location of the first non-source node is within the geofence, presenting the geofenced message; and responsive to determining that the first location of the first non-source node is not within the geofence, not presenting the geofenced message.

In some embodiments, the geofence may define a two-dimensional boundary. In some embodiments, the geofence may define a three-dimensional boundary.

In some embodiments, whether the first location of the first non-source node is within the geofence may be determined based on at least a portion of the geofenced message information. The portion of the geofenced message information may define a source location of the system and a geofence range from the source location. The portion of the geofenced message information may define a boundary of the geofence. The portion of the geofenced message information may define a limit on a number of hops for the geofenced message information transmission. The portion of the geofenced message information may further define a time of transmission of the geofenced message information by the system. The portion of the geofenced message information may define the communication range of the system.

In some embodiments, the first non-source node may be further configured to perform modifying the geofenced message information before transmitting the geofenced message information.

In some embodiments, transmission of the geofenced message information by the first non-source node may be limited to a maximum transmission number.

In some embodiments, transmission of the geofenced message information by the first non-source node may be limited based on proximity of the first location of the first non-source node to the geofence.

In some embodiments, the one or more non-source nodes may further include a second non-source node located at a second location. The first location of the first non-source node may not be within the geofence. The second location of the second non-source node may be within the geofence. The second non-source node may receive the geofenced message information from the first non-source node.

In some embodiments, the first non-source node may be included within a sensor device. The sensor device may include a smoke detector, a carbon monoxide detector, or a motion detector. The sensor device may be configured to perform categorizing the geofenced message. A priority of the geofenced message may be determined or changed based on the categorization of the geofenced messaged. The sensor device may be configured to perform communicating with a server responsive to receiving the geofenced message information.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

In some instances, it may be desirable to estimate or otherwise determine structural transformations of an architectural structure (e.g., structure), such as a building, warehouse, or the like. In some scenarios, it may be desirable to rapidly estimate such structural transformations and/or rapidly generate one or more models of the architectural structures in a manner that accounts for such structural transformations. Such estimates and/or models may bring to bear critical information useful in time-sensitive decision-making moments. For instance, in emergency situations where victims may be trapped inside a structure that has undergone a transformation (e.g., due to a catastrophic event such as a flood, tornado, earthquake, fire, or other event that induces stress on a structure such that the structure may transform), such estimates and/or models may inform first responders' approach for rendering assistance. Conventional approaches are static by nature, rely too heavily on human inspection and engineering analysis, and do not rapidly detect, estimate, model and/or report developing structural transformations in a timely fashion that can be reliably used to inform imminent decisions that need to be made on-the-fly. Accordingly, there exists a need for systems and methods for dynamically detecting and estimating structural transformations of an architectural structure and/or modeling the same in real-time, near-real time, or on-demand.

An improved approach rooted in computer technology overcomes the foregoing problem and other disadvantages associated with conventional approaches. In general, various systems and methods may be employed which, in one or more embodiments, receive positional data (e.g., positional information) associated with a plurality of nodes. Such nodes may be fixedly positioned on, within, and/or throughout a structure. The positional data of a node can reflect a proximity (e.g., with respect to another node, with respect to an object or other structure in the vicinity of the node, etc.), distance (e.g., with respect to another node, with respect to an object or other structure in the vicinity of the node, etc.), location (e.g., with respect to a local coordinate system, with respect to a global coordinate system, with respect to a custom coordinate system, with respect to another node or nodes, with respect to one or more other objects or other structures in the vicinity of the node, etc.), signal strength of the signal generated by or received at the node (e.g., as measured relative to another node (the node that is receiving the signal generated by the primary node, or that is generating the signal received by the primary node), or access point at two or more different times), and/or signal direction of the signal generated by or received at the node.

The positional data collected over a timeframe can reflect changes (e.g., displacements) in proximity, distance, location, signal strength, and/or signal direction over the timeframe for the node. Structural transformations can be estimated based on the positional data (or changes to such positional data over time). Additionally, based on structural information known to the system and/or the positional data obtained in connection therewith, structural transformations can also be predicted before they occur, which may also be used to inform (in real-time, near-real time, or on-demand) decisions that need to be made in the moment. The estimated structural transformations (or projected future structural transformations) can be presented on or with a model of the architectural structure. In some embodiments, the structural transformations can be presented using a virtual reality (VR) technology or an augmented reality (AR) technology. More details relating to the disclosed technology are below.

Figure 1:
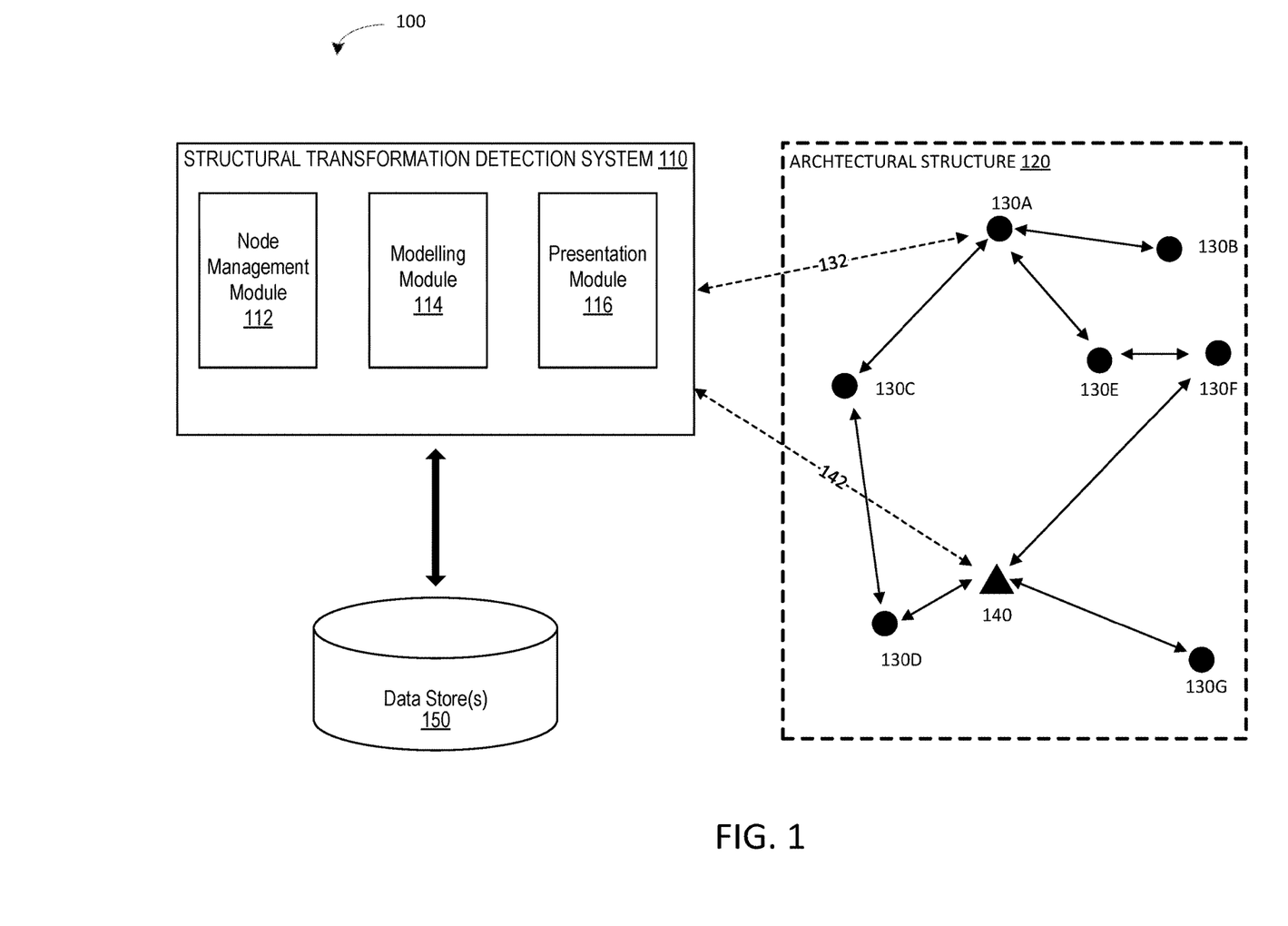
FIG. 1 illustrates an example environment including a structural transformation detection system in which one or more embodiments in accordance with the technology of the present disclosure may be implemented.

FIG. 1 illustrates an example environment 100 in which one or more embodiments of the technology disclosed herein may be implemented. The example environment 100 can include a structural transformation detection system 110 that can estimate, determine, generate, or otherwise provide, information relating to structural transformations of an architectural structure. The structural transformation detection system 110 may include, among other components, a node management utility 112, a modelling utility 114, a presentation utility 116, and/or other utilities. The utilities 112, 114, 116 can be communicatively connected with one another and can utilize various functionalities provided by one another in performing their own functions. The utilities illustrated in this figure and all figures herein are exemplary only, and other implementations may include additional, fewer, integrated, or different utilities, modules, engines, or other components. In various embodiments, one or more of the functionalities described in connection with the structural transformation detection system 110 can be implemented in any suitable combinations.

In some embodiments, the structural transformation detection system 110 can be implemented, in part or in whole, as software, hardware, or any combination thereof. In general, a system and any modules within the system, as discussed herein, can be associated with software, hardware, or any combination thereof. In some implementations, one or more functions, tasks, and/or operations of modules can be carried out or performed by software routines, software processes, hardware, and/or any combination thereof. In some cases, the structural transformation detection system 110 can be implemented, in part or in whole, as software running on one or more computing devices or systems, such as on a user or client computing device. For example, the structural transformation detection system 110, or at least a portion thereof, can be implemented as or within an application (e.g., app), a program, or an applet, or the like, running on a user computing device or a client computing system, such as the example computing circuit 500 of FIG. 5. In another example, the structural transformation detection system 110, or at least a portion thereof, can be implemented using one or more computing devices or systems that include one or more servers, such as network servers or cloud servers. It should be understood that there can be many variations or other possibilities.

Further, the structural transformation detection system 110 can be communicatively coupled with any number of nodes 130A-130G fixedly positioned throughout an architectural structure 120. The one or more nodes 130A-130G may further be communicatively coupled with one another, as well as with one or more mobile nodes (not shown) within or near the architectural structure 120. The one or more nodes 130A-130G can provide positional data concerning respective nodes themselves, or positional data of other nodes of the structural transformation detection system 110.

The one or more nodes 130A-130G can be beacons, gateways, hubs, terminals, or the like. The one or more nodes 130A-130G can include transmitters, receivers, or both (i.e., transceivers) configured to operate on any one or more communications protocol. In some embodiments, the one or more nodes 130A-130G can include transceivers that provide (continuously, periodically, or in response to one or more selections or requests) positional data associated with the nodes 130A-130G. In some embodiments, the one or more nodes 130A-130G can include transceivers that provide, or exhibit, (continuously, periodically, or in response to one or more selections or requests) signals, data, or operating information associated with the nodes 130A-130G, from which positional data may be—in whole or in part—derived or determined. In some embodiments, received or transmitted signals can have expected signal strengths at predetermined distances (or distance thresholds) such that a receiving node, hub, or system can determine proximity or distance from the node based on the strength of a particular signal (e.g., which may be transmitted to or received from a known source). In some embodiments, received or transmitted signals can have defined strength profiles such that a receiving node, hub, or system can determine proximity or distance from the node based on the strength of a particular signal having a defined strength profile (e.g., which may be transmitted to or received from a known source). In some embodiments, a strength profile describes the signal strength as a function of distance to/from the source of the signal (i.e., the transmitting node). In some embodiments, a strength profile for a particular node describes the strength of the signal transmitted by the particular node (i.e., the source node) at the point of reception by one or more surrounding nodes (placed in different locations and possibly at different distances) from the source node.

In some embodiments, the one or more nodes 130A-130G can determine or compute positional data using one or more sensor within the respective nodes, and/or within other nodes or devices of other devices, and/or based on other information available to the node(s). For example, a node 130A may include a global positioning system (GPS) sensor capable of determining its own location and provide positional data of the node. In another example, a node 130A may include a transceiver that receives a signal from a stationary device having a predetermined location coordinate known to the system (i.e., predetermined and stored within the system, e.g., at a back-end server of the system), and node 130A may compute its own location coordinate based on the location coordinate of the stationary device combined with the signal parameters of the signal received at node 130A from such stationary device (e.g., signal strength, signal direction). In another example, a node 130A may include an image capture device that captures periodic images of an object or structure within its field of view; the node 130A or the object or structure (or portion thereof) may have a predetermined location coordinate known to the system (i.e., predetermined and stored within the system, e.g., at a back-end server of the system), and node 130A may estimate a new location coordinate based on changes across images (e.g., if the object that normally appears to be of one size in the images suddenly appears to be considerably smaller and shifted in one direction, the node 130A may determine that it has moved relative to the other object, and may estimate a new location coordinate itself on the basis thereof). Moreover, any combination of the foregoing may also be utilized to determine or compute positional data. For example, taking the example of the image capture device that captures periodic images of an object or structure within its field of view and makes location determinations based on changes across images, it may be difficult in some scenarios to determine whether the location coordinate of the node itself changed, or if the location of the object or structure changed, or if both changed. Accordingly, in addition to changes detected in the images, the node may also take into account new GPS coordinates obtained from its own GPS module and/or the GPS module for one or more other nodes or objects/structures. Suppose, for example, the object for which the size has changed in a sequence of images is a smoke detector fixed to the ceiling of a room. Suppose further that the smoke detector is also equipped with a GPS module. Upon detecting a change in size of the smoke detector through image analysis, the node may be configured to acquire updated GPS coordinate readings from its own GPS module and the smoke detector's GPS module. Equipped with this information, the node(s) and/or system generally can make much more informed decisions regarding any structural changes that may or may not have taken place. Moreover, equipped with this information, the node(s) and/or system generally can filter out changes that do not actually reflect structural transformations. For example, if a node's image capture device identifies that the position of the smoke detector changes from the upper left corner of a frame to the lower right corner of the frame as between two different frames, it could be representative of an actual structural transformation of the architectural structure, or it could simply be the result of a technician in the building adjusting the angle that the node 130A faces (such that the camera is facing in a slightly different direction). If node 130A obtains updated readings from its own GPS module and the smoke detector's GPS module and finds there are no changes to the coordinates across the same timeframe within which the images changed, the node(s) and/or the system may determine that it was the latter scenario (i.e., a technician simply adjusting the facing direction of the node). A person of skill in the art will appreciate from the present disclosure that there are many other combinations of information that may be obtained via nodes 130A-130G that can be used, alone or in combination, to inform the determination of positional data which in turn may be used to determine and estimate structural transformations.

The one or more nodes 130A-130G can be in direct communication or indirect communication with each other. In FIG. 1, for example, nodes 130A and 130B, 130A and 130E, nodes 130E and 130F, nodes 130A and 130C, nodes 130C and 130D are directly communicatively connected. The nodes 130A and 130F are indirectly communicatively connected via a common node 130E. The node 130A can provide positional data of itself and other connected nodes to the structural transformation detection system 110 via a communication path 132. In some embodiments, the nodes can provide their positional data to the structural transformation detection system 110 via a hub (e.g., a router, a switch, or the like). For example, nodes 130D, 130F, 130G are communicatively connected with a hub 140 which, in turn, can provide positional data to the structural transformation detection system 110 via a communication path 142. In some embodiments, the nodes 130A-130G may form a mesh network. A node within the mesh network may refer to a connection point that can receive, generate, store, and/or transmit positional data along one or more communication paths.

The structural transformation detection system 110 can be can be configured to communicate and/or operate with the at least one data store 150, as shown in the example environment 100. The data store 150 can be configured to store and maintain various types of data. In some implementations, the data store 150 can store data generated by or otherwise associated with the modules 112, 114, 116. For example, the data store 150 can maintain data about nodes including node identifiers, positions of the nodes, distances to the nodes, relative distances between nodes, timestamps that correspond to past and current positions of the nodes, or the like. The data store 150 can maintain data about one or more architectural representations including blueprints, computer-aided design (CAD) schematics, representations showing structural transformations, representations showing structural transformations, or the like. The architectural representations can be obtained from the data store 150, a remote server, or a cloud. The data store 150 can maintain data for presenting the architectural representations including presentation device information, authorization to access the presentations, or the like. The data store 150 can maintain additional data including registrations to and subscriptions for using the structural transformation detection system 110. In some embodiments, the data store 150 can further maintain where to notify, such as an email address or a cellular number, when an undesirable structure transformation has been detected. It is contemplated that there can be many variations or other possibilities.

As shown in the structural transformation detection system 110, the structural transformation detection system 110 can include a node management module 112. The node management module 112 can be configured to manage one or more nodes 130A-130G fixedly positioned throughout the architectural structure 120. The node management module 112 can be configured to identify a node as a particular node and manage its positional data. For example, the node management module 112 can manage a node identifier for the particular node and any positional data pertaining to the node identifier. The node management module 112 can maintain past positional data of the particular node and any updates to the positional data. In some embodiments, the node management module 112 can receive positional data transmitted by a transmitter of the particular node. In some embodiments, the node management module 112 can request and receive the positional data. In some embodiments, the node management module 112 may maintain a network of certain nodes as related to a particular architectural structure or a portion thereof, and associate the particular node as belonging in, or otherwise associated with, the network. As will be further described in relation to a modelling module 114, the architectural structure 120 can be segmented into numerous segments and each segment can be associated with a network of nodes. The node management module 112 is described in greater detail herein with reference to FIG. 2.

The structural transformation detection system 110 can include a modelling module 114. The modelling module 114 can be configured to generate, maintain, and provide one or more models of the architectural structure 120. In some embodiments, a model can be a blueprint of the architectural structure 120. In some embodiments, a model can be generated based on the blueprint of the architectural structure 120. For example, the modelling module 114 may receive a blueprint of the architectural structure 120 and generate a model that better represents a particular purpose of providing information regarding structural transformations of the architectural structure 120. In some embodiments, the modelling module 114 can segment the model into multiple segments. For example, the architecture structure 120 can be segmented by floors, by cardinal directions (e.g., east, west, south, north, northeast), by functionalities associated with various parts of the architectural structure 120, or by structural features. The segments can be mutually exclusive or can be overlapping. Each segment can be associated with a respective network of nodes as managed by the node management module 112. In other words, each segment may have its own network of nodes.

In some embodiments, the modelling module 114 can analyze a model to identify structural transformations of the architectural structure 120 and provide the structural transformations with the model. For example, the modelling module 114 can obtain information about various structural components from a blueprint and associated properties including stress tolerances of the structural components from a catalogue of structural components. Then, the modelling module 114 can analyze, based on the properties of each structural components and a design of the architectural structure 120 as reflected in the model, the model to determine structural transformations. In some embodiments, a structural engineer can provide real-time feedback regarding structural transformations and likely structure failures. The structural engineer can be remotely located and can, in some instances, provide the feedback in real-time to further adjust the model. The modelling module 114 can determine a degree of potential danger associated with the identified transformations and possible causes of the identified transformations. The modelling module 114 can analyze positional data from the nodes 130A-130G to determine any structural transformations that have occurred. Further, the modelling module 114 can determine a degree of potential danger associated with the structural transformations and possible causes of the structural transformation. In some embodiments, the modelling module 114 can generate predictions of imminent structural transformations based on one or more generated models. For example, the modelling module 114 can generate predictions about a building collapse and, if a building has already collapsed, further potential building collapse in a certain segment of the building.

In certain embodiments, the modelling module 114 can generate the predictions of imminent building transformations with a machine learning model trained to predict such building transformations. Various machine learning techniques can train the machine learning model by providing the machine learning model with blueprints and analyses of structural engineers on transformations of structures reflected in the blueprints. In some embodiments, the machine learning model can be trained based on changes in positional data over time and related structural transformations of buildings.

The presentation module 116 can be configured to present the structural transformations and transformations determined by the modelling module 114. The structural transformations can be presented in various formats including an overlay on the model. For example, the structural transformations can be represented with colors ranging from green to red and/or painted over structural components or portions of the architectural structure 120 associated with corresponding transformations. In some embodiments, the structural components or portions (e.g., segments) can be annotated with corresponding transformations in the model. The presentation module 116 can provide the model in an augmented reality (AR) or a virtual reality (VR) view. For instance, the model can be presented in an AR view on a smartphone screen as a camera interface of the smart phone is capturing the architectural structure 120. The camera interface can capture an overall architecture from outside the architectural structure 120 or a portion of the architectural structure 120 from inside. The identified structural transformations can be presented in the AR or VR view over an image captured by the camera interface. As described, the AR or VR view can be presented in an overlay and/or with annotations. Similarly, the structural transformations can be presented in the overlay with annotations. In some embodiments, warnings relating to the structural transformations can be provided in the presentation. For example, the structural transformations can be presented in particular colors and/or annotated with a degree transformation, such as 15 centimeter displacement based on positional data of the nodes. Additionally, the presentation can provide information relating to a degree of potential danger associated with the transformation and possible causes of the transformation as determined by the modelling module 114. Further, the presentation can provide information relating how to navigate toward a structural transformation or a structural transformation in the AR or VR view. For example, an arrow or a compass providing directions with a distance to the structural transformations or transformations can be provided in the presentation. In some embodiments, the presentation provided in an immersive environment, such as in the VR view, and can be virtually navigable.

In some embodiments, the presentation module 116 can be configured to allow a viewer to manipulate the presentation. For example, the viewer may select to filter out any insignificant structural transformations or transformations. The viewer may rotate or scale the presentation to better view certain structural transformations or transformations. Additionally, the viewer may select to filter out any structural transformations that do not relate to rotational structural transformations so as to focus on rotational structural transformations.

Figure 2:
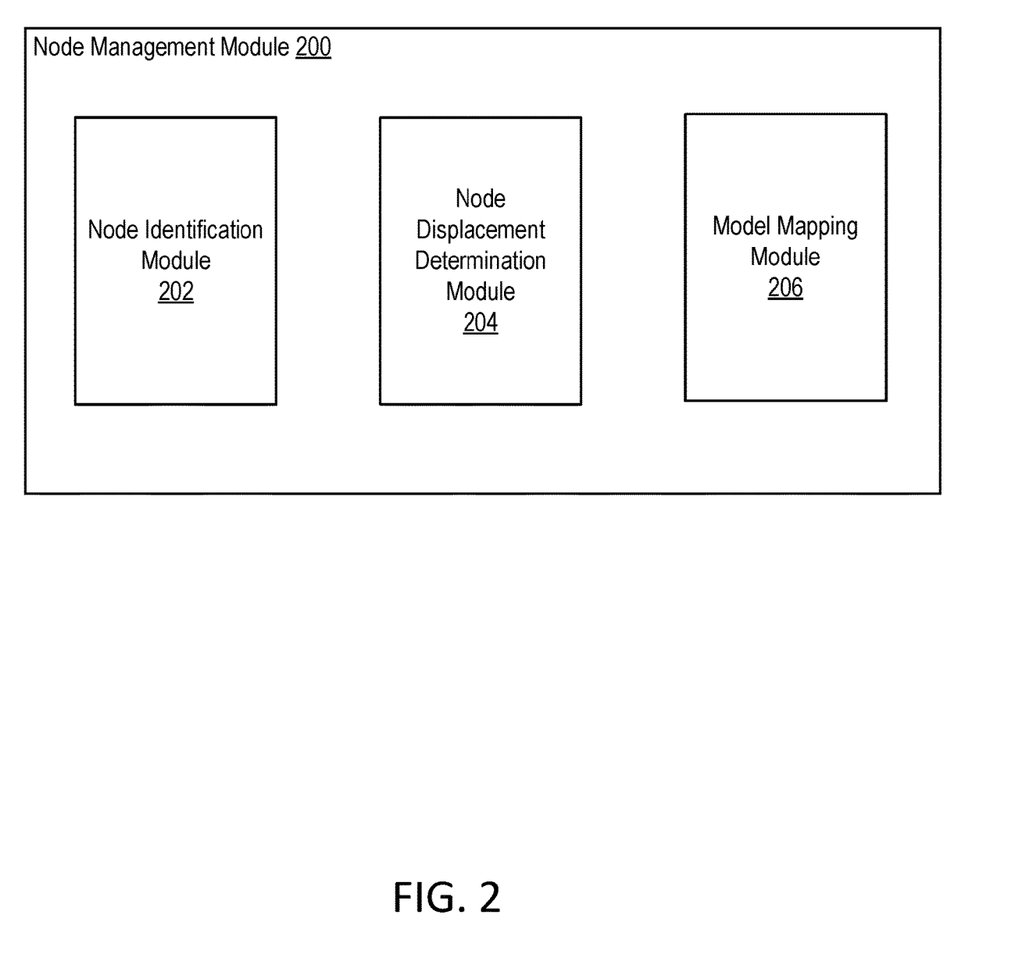
FIG. 2 illustrates an example node management module in which one or more embodiments in accordance with the technology of the present disclosure may be implemented.

FIG. 2 illustrates an example node management module 200 in which one or more embodiments in accordance with the technology of the present disclosure can be implemented. The node management module 200 can be configured to manage data regarding one or more nodes positioned throughout an architectural structure. In some embodiments, the node management module 112 of FIG. 1 can be implemented as the node management module 200. As shown in FIG. 2, the node management module 200 can include a node identification module 202, a node displacement determination module 204, and a model mapping module 206.

The node identification module 202 can be configured to manage one or more nodes fixedly positioned throughout an architectural structure. As described, the one or more nodes can be communicatively connected in a network. The network of nodes can be associated with an architectural structure or a segment thereof. The one or more nodes can identify themselves. For example, the one or more nodes can provide identifying information of themselves. In some embodiments, the identifying information can be a node identifier (e.g., a node ID), such as NODE ID: "ND385". In some embodiments, the identifying information of a node can be a tuple of a network identifier of a network in which the node belongs and the node ID, such as {NETWORK ID: "NT0093", NODE ID: "ND385"}. In some embodiments, the identifying information can include an architectural structure identifier, such as {BUILDING ID: "BU0001928", NETWORK ID: "NT0093", NODE ID: "ND385"}. In some embodiments, the identifying information can include information relating to a segment to which the node is mapped. Further details will be provided in relation to the model mapping module 206.

In certain embodiments, the node identifying information can further comprise additional information associated with the node including a node type indicating whether the node is a beacon, a gateway, a hub, a terminal, or the like. In some embodiments, the node identifying information may further include a history of the node including an installation timestamp, a version of a firmware installed on the node, and/or sensing capability of the node. For example, the node identifying information indicate that the node has a global positioning system (GPS) sensor that enables the node to determine its position. Further, the node identifying information can indicate that the node has an accelerometer, inertial measurement unit (IMU), gyroscope, or other types of sensors that can enable the node to individually determine some event that may have caused the node to experience a change in position.

Further, the node identifying information can indicate that the node has a certain set of communication capabilities. For example, a node can be equipped with an ultra-wide band capability (e.g., ultra-wide band indoor positioning capability) and a cellular capability. The node management module 112 can determine, when a first set of nodes indicated to have only cellular capability are not providing data when a second set of nodes indicated to have both ultra-wide band capability and cellular capability provide data over ultra-wide band, that the lack of data from the first set of nodes is not due to a catastrophic failure but a temporary shutdown of a cellular network. In some embodiments, a node equipped with multiple communication capabilities can provide the node identifying information over another communication network when one communication network does not appear to function. For example, cellular network can be adopted over non-functioning Wi-Fi or ultra-wide band, and vice versa. In some embodiments, the node management module 112 can notice that a node is not providing data over a communication network and switch over to another communication network to communicate with the node. Accordingly, the node identifying information can enable the node management module 112 to identify a particular node and track any changes to the node or its environment based on the identification. Many variations are possible.

The node displacement determination module 204 can be configured to acquire positional data associated with one or more nodes fixedly positioned throughout an architectural structure over time and determine changes in positions of nodes based on the positional data. As described, each node can provide positional data along with node identifying information of the node. In some embodiments, the positional data can be determined at the node and provided to the node displacement determination module 204. For example, the node may determine its position based on its GPS sensor and provide positional data including the position. In some embodiments, the positional data can be determined at the node displacement determination module 204 based on other data relevant to determining a position of the node. For example, signal strength can be determined by a receiver based on a signal received from the node. From the signal strength, a distance from the receiver to the node can be determined. Other data relevant to determining a position of the node can be relative distances between the node and other nodes. Various techniques, such as triangulation techniques, can be used to determine a position of the node based on the relative distances. In some embodiments, the positional data of the node can be represented with coordinates. For example, the positional data can be represented with Cartesian coordinates of {X: 15.109, Y: 60.437, Z: 2.489}. Other coordinate systems can be used including polar coordinates, cylindrical and spherical coordinate systems, or the like. In some embodiments, various filtering techniques can be used to identify and remove grossly outlying positional data that can be caused by a temporary malfunction of a sensor in a node or network communication.

The positional data can be associated with a timestamp at which the positional data was received or determined. The node displacement determination module 200 can receive first positional data of a particular node at a first time and second positional data of the particular node at a second time. Based on the first and second positional data, a displacement of the node over the time can be determined. For example, if the first positional data at the first time is {X: 15.109, Y: 60.437, Z: 2.0489} and the second positional data at the second time is {X: 15.301, Y: 60.411, Z: 2.0487} for the node on the Cartesian plane, the displacement of the node can be {ΔX: 0.192, ΔY: −0.026, ΔZ: −0.0002}. Similarly, a third positional data for the node at a third time can be used to determine a displacement between the second time and the third time. Such displacement determination can be performed for multiple nodes to determine displacements of respective nodes. In some embodiments, various techniques can be used to remove or dampen effects of grossly outlying determined displacements. For example, if positional data of a node substantially positions the node at the same position at a first time and a third time but not at a second time between the first time and the third time, positional data associated with the second time can be replaced with an interpolation of the positional data at the first time and the third time. In some embodiments, such outlying positional data or displacement determinations resulting from the outlying positional data can be filtered out. In some embodiments, multiple of the positional data or the displacement determinations can be aggregated to enhance accuracy and/or eliminate such outliers.

The determined displacements of multiple nodes, collectively, can provide wholistic understanding of how the nodes have moved over time and, in turn, how the architectural structure has transformed based on how the nodes have moved. For example, a first node and a second node may have rotated in the same direction on the Cartesian XY-plane relative to a third node. Such rotational displacement (e.g., a rotation on W-axis) is not readily recognizable when displacements of a single node are considered. More details will be provided with reference to FIGS. 3A-3B.

The model mapping module 206 can be configured to map one or more nodes to a model of an architectural structure, such as a model provided via the modelling module 114. As described, positional data associated with one or more nodes fixedly positioned throughout the architectural structure can be received. Based on the positional data, the one or more nodes can be mapped to a corresponding position in the model. In some embodiments, one or more reference points and a reference scale factor based on which to synchronize the model and the positional data can be provided to the model mapping module 206. In some embodiments, the model mapping module 206 can automatically map the nodes to the model based on a known algorithm with which the nodes are to be positioned for an architectural structure represented by the model. In some embodiments, a structural engineer can confirm, or make adjustments as needed for, the mapping of the nodes to the model. As the nodes are mapped to the model, displacements of the nodes can provide insight into structural transformations of the architectural structure. For example, "tilting" of the architectural structure—e.g., displacements detected along X-axis and Y-axis as would be observed for the Leaning Tower of Pisa—may be indicated by nodes positioned on various segments of the architectural structure. The "tilting" can be reflected in an updated model of the model. The presentation module 116 can visually represent the updated model. In some embodiments, the presentation module 116 can provide a comparison between the original model and the updated model. The comparison can include a timeline of the structural transformation, a time lapse of the structural transformation, a visualization of changes regarding structural stress on certain portions of the architectural structure, or the like With reference back to the modelling module 114, the modelling module 114 can identify structural transformations associated with the architectural structure. Similarly, the modelling module 114 can determine an increase in the identified structural transformations based on the structural transformation. Additionally, the modelling module 114 can determine a degree of increase in potential danger associated with the increased structural transformations and possible causes of the structural transformations. In some embodiments, the modelling module 114 can predict possible further structural transformations of the architectural structure. For example, models may indicate that the structural transformation is consistent and accelerating. Based on the updated model, the modelling module 114 can predict that the architectural structure may collapse at a certain time in future in a certain way. In some embodiments, the modelling module 114 can predict that the architectural structure may not be able to withstand a natural event with certain amount of force, such as an earthquake with a strength of 4.3 on a Richter scale. In some embodiments, the modelling module 114 can further provide representations of how the structural transformation may have developed and how future structural transformations may develop.

Figure 3A:
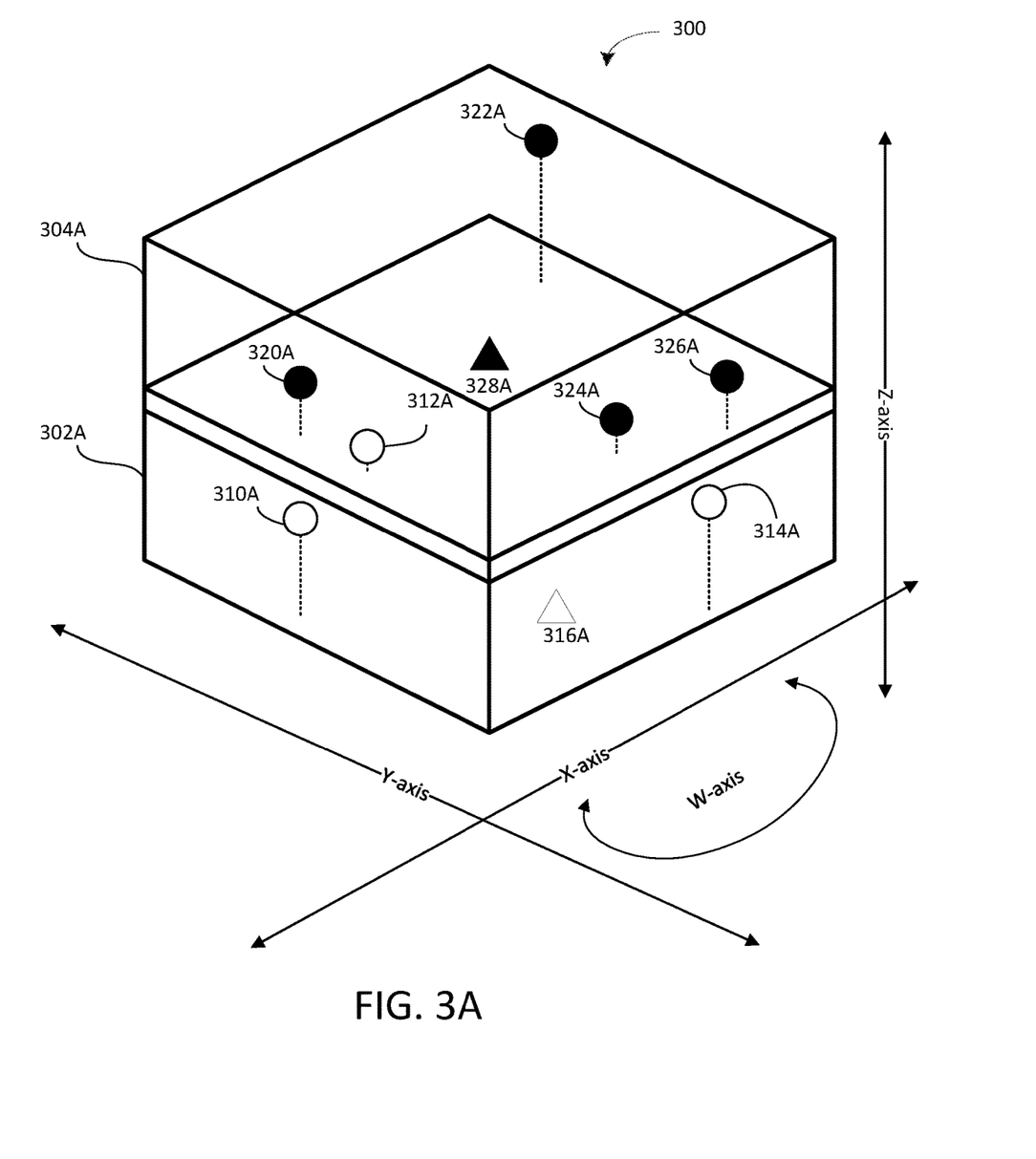
FIG. 3A illustrates an example architectural structure before a structural transformation in accordance with one or more embodiments of the technology disclosed herein.

FIG. 3A illustrates an example architectural structure 300 before structural changes. The example architectural structure 300 has two segments each representing a first floor 302A and a second floor 304A. Nodes 310A, 312A, 314A are positioned throughout the first floor 302A. Nodes 320A, 322A, 324A, 326A are positioned throughout the second floor 304A. The nodes 310A, 314A are positioned at higher height than the node 312A on the first floor 302A. The second floor 304A has its nodes 320A, 322A, 324A, 326A positioned, from highest placement to lowest placement, in an order of nodes 322A, 326A, 320A, 324A. As described, each node can be equipped with sensors capable of determining their own positions and provide determined positional data to the structural transformation detection system 110. In some embodiments, the positional data regarding the nodes can be determined based on signal strength received from the nodes. In some embodiments, a hub node or a hub device can determine positional data of another node based on signal strength received form another device. For example, a first hub device 316A positioned on the first floor 302A can receive signals from nodes 310A, 312A, 314A positioned on the first floor 302A and determine positional data for the nodes 310A, 312A, 314A based on respective signal strengths. Similarly, a second hub device 328A positioned on the second floor 304A can receive signals from nodes 320A, 322A, 324A, 326A positioned on the second floor 304A and determine positional data for the nodes 320A, 322A, 324A, 326A. While each of the hub devices 316A, 328A can receive signals from nodes placed in a different floor, the respective hub devices 316A, 328A may disregard signals from a node positioned on a different floor based on a segment identifier provided by the node indicating that the node is associated with another segment (e.g., different floor). In some embodiments, positional data can be relative from another node or a hub device. For example, positional data associated with the node 310A can be relative position of the node 310A from the node 314A or the first hub device 316A based on signal strength received from the node 310A. The relative position can be translated into an absolute position based on a reference point. For example, the first hub device 316A can be a reference point with a known coordinate and can translate relative positions of the nodes 310A, 312A, 314A into defined coordinates on a coordinate system, such as the illustrated coordinate system including X-axis, Y-axis, and Z-axis. In some embodiments, the hub device 316A can transmit the defined coordinates of a node and other nodes to the node so that the node can be aware of its coordinate and coordinates of the other nodes.

In certain embodiments, the nodes can be in a mesh network where each node 310A, 312A, 314A, 320A, 322A, 324A, 326A can act as a hub device 316A, 328A and vice versa. Each node can receive, from other nodes, what other nodes consider as relative positions of the node from the other nodes. Based on changes in the relative positions of the node from the other nodes, the node can determine likelihood of its displacement. For example, if the node 320A sees no change in relative position based on signals received from the nodes 322A, 326A, but sees a change in relative position of the node 324A, the node 320A can determine that it is likely that a portion of an architectural structure associated with the node 324A is going through a structural transformation. In this example, the node 324A sees changes in relative positions to the nodes 320A, 322A, 326A and determines that the node 324A itself is going through the structural change. Each node can determine a likelihood or a degree of its displacement and notify the structural transformation detection system 110 when the likelihood or the degree of its displacement rises above a pre-determined threshold. The displacements of the nodes can also be represented on a coordinate system, such as the illustrated coordinate system. In some embodiments, displacements can be represented with additional axes, including the illustrated W-axis which can facilitate representations of rotational structural changes.

Figure 3B:
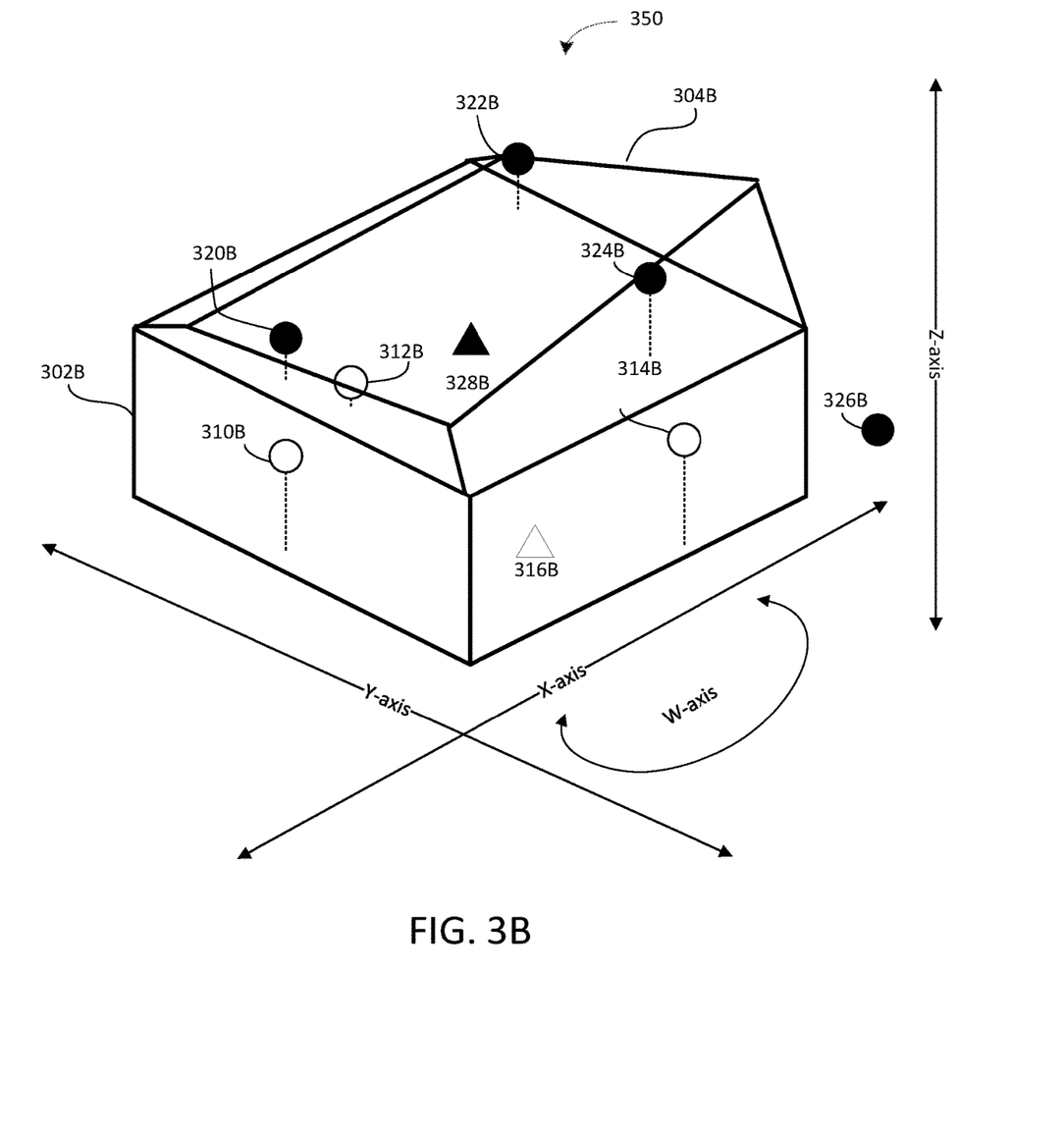
FIG. 3B illustrates the example architectural structure shown in FIG. 3A after a structural transformation in accordance with one or more embodiments of the technology disclosed herein.

FIG. 3B illustrates an example architectural structure 350 after structural transformations. In contrast with FIG. 3A, the second floor 304B has transformed with west portion of the building showing some collapse. The nodes 320B, 322B, 324B, 326B and the second hub device 326B have experienced the collapse. In particular, the node 320B positioned experienced some negative displacement along the Z-axis (e.g., lost height). The node 322B experienced some negative displacement along both the Y-axis and Z-axis. The node 324B experienced some positive displacement along both the X-axis and Z-axis. In some embodiments, the displacement of the node 324B along the X-axis may be represented as a counter-clockwise rotation in relation to a reference point, such as the second hub device 328B, on a rotational axis (e.g., W-axis). The node 326B is represented in the FIG. 3B as providing positional data outside the transformed architectural structure 350. In some instances, the positional data can be caused by a malfunctioning node having erroneous sensor reading or signal strength. If the structural transformation has occurred slowly over time, such outlying positional data can be filtered out. In some other instances, a sudden structural transformation, such as collapse of the second floor 304B from an earthquake, can cause the node 326B to actually fall outside the architectural structure 350. It is contemplated that such outlying positional data may provide particular insight into how the sudden structural transformation affected the architectural structure. Where no insight can be gathered based on the outlier positional data, the outlier positional data can be filtered out lest it affect analysis of the structural transformation disproportionately.

Figure 4:
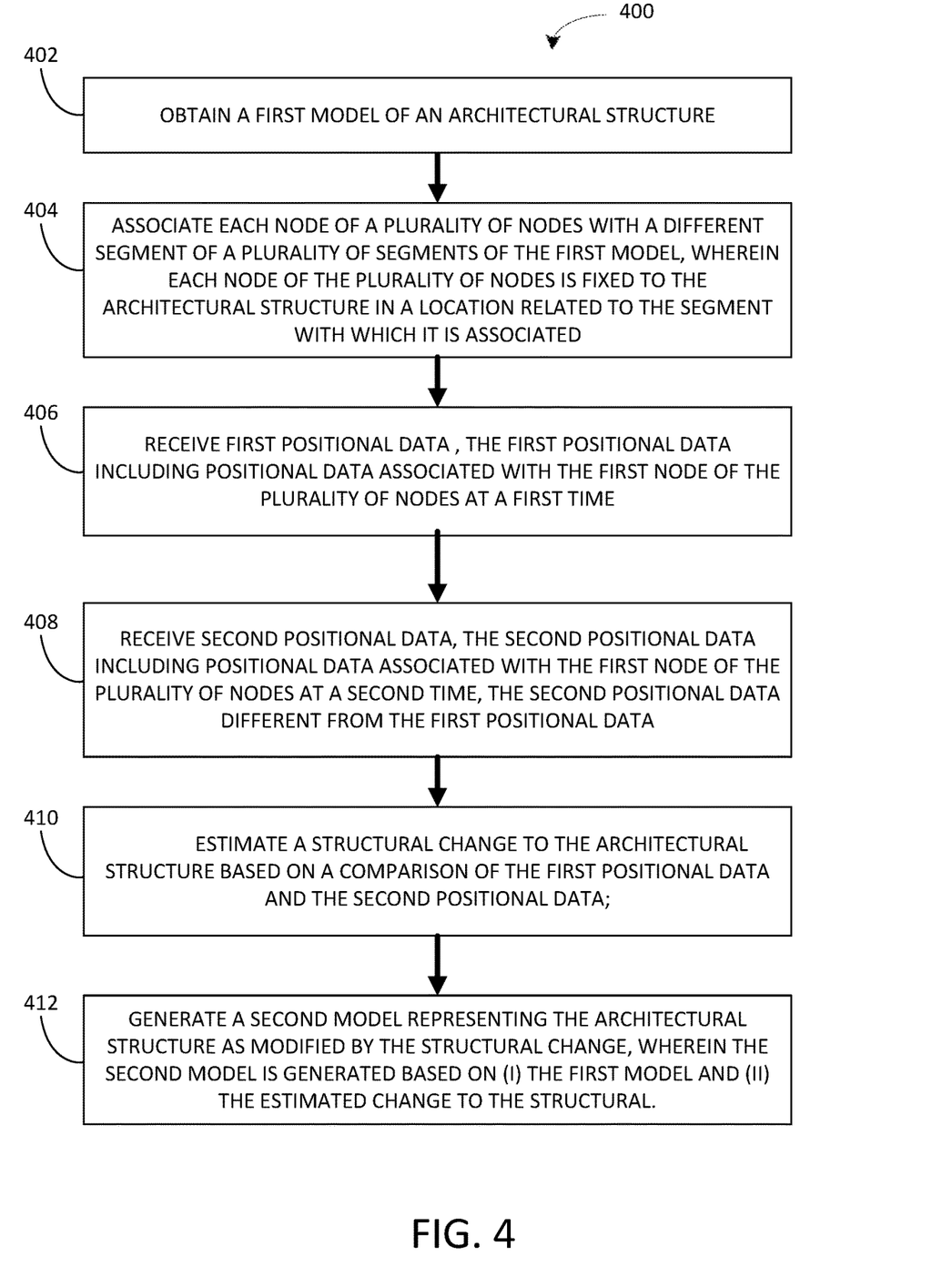
FIG. 4 illustrates an example method in accordance with one or more embodiments of the technology disclosed herein.

FIG. 4 illustrates an example method 400 that may be implemented in accordance with one or more embodiments of the technology disclosed herein. The steps of the method 400 may be implemented in/through one or more computing devices, such as a computing circuit 500 of FIG. 5. At step 402, a first model of an architectural structure comprising a plurality of segments can be obtained. At step 404, each node of a plurality of nodes can be fixed to the architectural structure and associated with a different segment of the plurality of segments of the first model. At step 404, first positional data including positional data associated with the first node of the plurality of nodes at a first time can be received. At step 406, second positional data including positional data associated with the first node of the plurality of nodes at a second time can be received. The second positional data can be different from the first positional data. At step 408, a structural change to the architectural structure can be estimated based on a comparison of the first positional data and the second positional data. At step 410, a second model representing the architectural structure as modified by the structural change can be generated. The second model can be generated based on (i) the first model and (ii) the estimated change to the architectural structure.

As used herein, the term circuit/logic might describe a given unit of functionality that can be performed in accordance with one or more embodiments of the technology disclosed herein. As used herein, a circuit/logic might be implemented utilizing any form of hardware, software, firmware, or a combination thereof. For example, one or more processors, controllers, ASICs, PLAs, PALs, CPLDs, FPGAs, logical components, software routines or other mechanisms might be implemented to make up a circuit/logic. In implementation, the various circuits/logics described herein might be implemented as discrete circuits/logics or the functions and features described can be shared in part or in total among one or more circuits/logics. In other words, as would be apparent to one of ordinary skill in the art after reading this description, the various features and functionality described herein may be implemented in any given application and can be implemented in one or more separate or shared circuits/logics in various combinations and permutations. Even though various features or elements of functionality may be individually described or claimed as separate circuits/logics, one of ordinary skill in the art will understand that these features and functionality can be shared among one or more common software and hardware elements, and such description shall not require or imply that separate hardware or software components are used to implement such features or functionality.

Where components or circuits/logics of the technology are implemented in whole or in part using software, in one embodiment, these software elements can be implemented to operate with a computing or processing circuit/logic capable of carrying out the functionality described with respect thereto. After reading this description, it will become apparent to a person skilled in the relevant art how to implement the technology using other computing circuits/logics or architectures.

Figure 5:
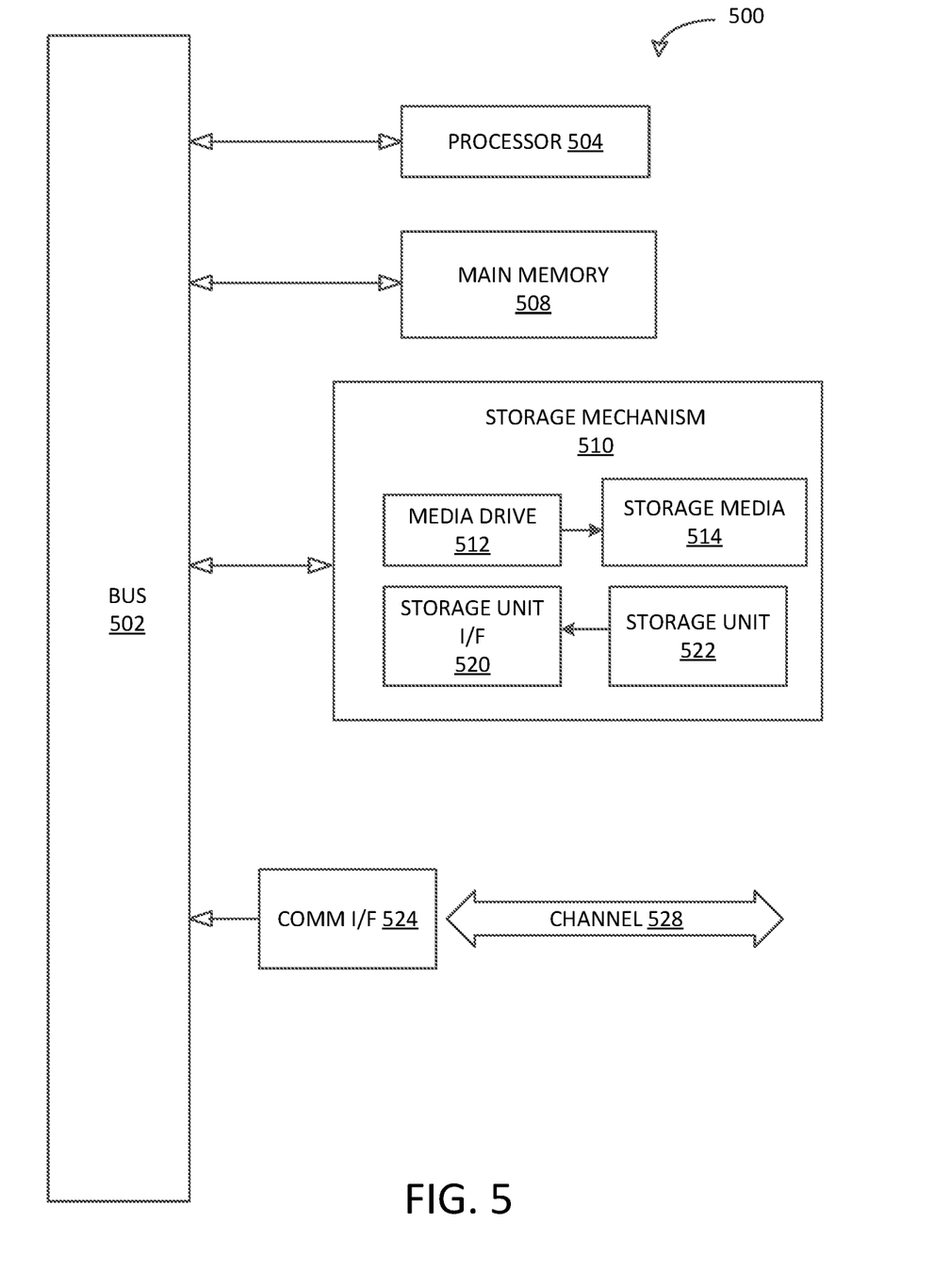
FIG. 5 illustrates an example computing circuit that may be used in implementing various features of embodiments of the technology disclosed herein.

Referring now to FIG. 5, computing circuit 500 may represent, for example, computing or processing capabilities found within desktop, laptop and notebook computers; hand-held/wearable computing devices (PDA's, smart phones, smart glasses, cell phones, palmtops, etc.); mainframes, supercomputers, workstations or servers; or any other type of special-purpose or general-purpose computing devices as may be desirable or appropriate for a given application or environment. Computing circuit 500 might also represent computing capabilities embedded within or otherwise available to a given device. For example, a computing circuit might be found in other electronic devices such as, for example, digital cameras, navigation systems, cellular telephones, portable computing devices, modems, routers, WAPs, terminals and other electronic devices that might include some form of processing capability.

Computing circuit 500 might include, for example, one or more processors, controllers, control circuits, or other processing devices, such as a processor 504. Processor 504 might be implemented using a general-purpose or special-purpose processing engine such as, for example, a microprocessor, controller, or other control logic. In the illustrated example, processor 504 is connected to a bus 502, although any communication medium can be used to facilitate interaction with other components of computing circuit 500 or to communicate externally.

Computing circuit 500 might also include one or more memory components, simply referred to herein as main memory 508. For example, preferably random access memory (RAM) or other dynamic memory, might be used for storing information and instructions to be executed by processor 504. Main memory 508 might also be used for storing temporary variables or other intermediate information during execution of instructions to be executed by processor 504. Computing circuit 500 might likewise include a read only memory ("ROM") or other static storage device coupled to bus 502 for storing static information and instructions for processor 504.

The computing circuit 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a floppy disk drive, a magnetic tape drive, an optical disk drive, a CD or DVD drive (R or RW), or other removable or fixed media drive might be provided. Accordingly, storage media 514 might include, for example, a hard disk, a floppy disk, magnetic tape, cartridge, optical disk, a CD or DVD, or other fixed or removable medium that is read by, written to or accessed by media drive 512. As these examples illustrate, the storage media 514 can include a computer usable storage medium having stored therein computer software or data. For example, one or more memory components may include non-transitory computer readable medium including instructions that, when executed by the processor 504, cause the computing circuit 500 to perform one or more functionalities described herein.

In alternative embodiments, information storage mechanism 510 might include other similar instrumentalities for allowing computer programs or other instructions or data to be loaded into computing circuit 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot, a PCMCIA slot and card, and other fixed or removable storage units 522 and interfaces 520 that allow software and data to be transferred from the storage unit 522 to computing circuit 500.

Computing circuit 500 might also include a communications interface 524. Communications interface 524 might be used to allow software and data to be transferred between computing circuit 500 and external devices. Examples of communications interface 524 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 524 might typically be carried on signals, which can be electronic, electromagnetic (which includes optical) or other signals capable of being exchanged by a given communications interface 524. These signals might be provided to communications interface 524 via a channel 528. This channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing circuit 500 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent circuit names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "circuit" does not imply that the components or functionality described or claimed as part of the circuit are all configured in a common package. Indeed, any or all of the various components of a circuit, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is, all the technology disclosed herein and equivalents thereof, including but not limited to:

1. A system comprising:
   at least one processor;
   at least one memory storing computer-readable instructions that, when executed by the at least one processor, causes the system to:
   obtain a first model of an architectural structure;
   associate each node of a plurality of nodes with a different segment of a plurality of segments of the first model, wherein each node of the plurality of nodes is fixed to the architectural structure in a location related to the segment with which it is associated;
   receive first positional data, the first positional data including positional data associated with the first node of the plurality of nodes at a first time;
   receive second positional data, the second positional data including positional data associated with the first node of the plurality of nodes at a second time, the second positional data different from the first positional data;

estimate a structural change to the architectural structure based on a comparison of the first positional data and the second positional data; and generate a second model representing the architectural structure as modified by the structural change, wherein the second model is generated based on (i) the first model and (ii) the estimated change to the architectural structure.

2. The system of claim 1, wherein the computer-readable instructions further cause the system to:

receive a blueprint of the architectural structure; and generate the first model based on the blueprint.

3. The system of claim 1, wherein the computer-readable instructions further cause the system to:

predict a future structural change based on the second model.

4. The system of claim 1, wherein the computer-readable instructions further cause the system to:

identify one or more structural transformations of the architectural structure;

generate one or more annotations associated with the identified structural transformations; and update the second model to include the one or more annotations.

5. The system of claim 4, wherein the instructions further cause the system to:

generate a presentation that reflects the structural change, the presentation including the one or more annotations.

6. The system of claim 5, wherein the presentation is at least one of an augmented reality (AR) presentation or a virtual reality (VR) presentation.

7. The system of claim 6, wherein the identified structural transformations are overlaid over an image of the structure captured by a camera device.

8. The system of claim 1, wherein the first and second positional data are defined based on at least one of X-axis, Y-axis, or Z-axis coordinates and the structural change is defined based on the at least one of X-axis, Y-axis, or Z-axis coordinates.

9. The system of claim 8, wherein the computer-readable instructions further cause the system to:

determine a rotational change based on the first and second positional data in relation to a reference point.

10. The system of claim 9, wherein the structural change can be filtered in the second model based on at least one of X-axis, Y-axis, Z-axis, or rotational changes.

11. The system of claim 1, wherein the computer-readable instructions further cause the system to:

determine the second positional data based on at least one of a proximity or a distance from a reference point.

12. The system of claim 8, wherein the reference point is a third positional data associated with a second node of the plurality of nodes at the first point in time and the second positional data is indicative of at least one of relative proximity or a relative distance from the third positional data.

13. The system of claim 1, wherein the plurality of nodes comprise at least one of a beacon, a gateway, or a terminal.

14. The system of claim 1, wherein the computer-readable instructions further cause the system to:

aggregate the plurality of positional data over time;

determine at least some of the plurality of positional data as outliers; and filter out the outliers.

15. The system of claim 1, wherein the first node comprises a transmitter, wherein the computer-readable instructions further cause the system to:

determine the second positional data based on a signal strength of the transmitter.

16. The system of claim 15, wherein the transmitter utilizes at least one of ultra-wide band positioning or a mesh network.

17. The system of claim 16, wherein the mesh network utilizes cellular signals to communicate with the first node when Wi-Fi is not available to the first node.

18. A computer-implemented method comprising:

obtaining, by a computing system, a first model of an architectural structure;

associating, by the computing system, each node of a plurality of nodes with a different segment of a plurality of segments of the first model, wherein each node of the plurality of nodes is fixed to the architectural structure in a location related to the segment with which it is associated;

receiving, by the computing system, first positional data, the first positional data including positional data associated with the first node of the plurality of nodes at a first time;

receiving, by the computing system, second positional data, the second positional data including positional data associated with the first node of the plurality of nodes at a second time, the second positional data different from the first positional data;

estimating, by the computing system, a structural change to the architectural structure based on a comparison of the first positional data and the second positional data; and generating, by the computing system, a second model representing the architectural structure as modified by the structural change, wherein the second model is generated based on (i) the first model and (ii) the estimated change to the architectural structure.

19. The computer-implemented method of claim 18, wherein the plurality of nodes comprise at least one of a beacon, a gateway, or a terminal.

20. The computer-implemented method of claim 18, wherein the first node comprises a transmitter, wherein the computer-readable instructions further cause the system to:

determine the second positional data based on a signal strength of the transmitter.

\* \* \* \* \*